UNITED STATES PATENT OFFICE.

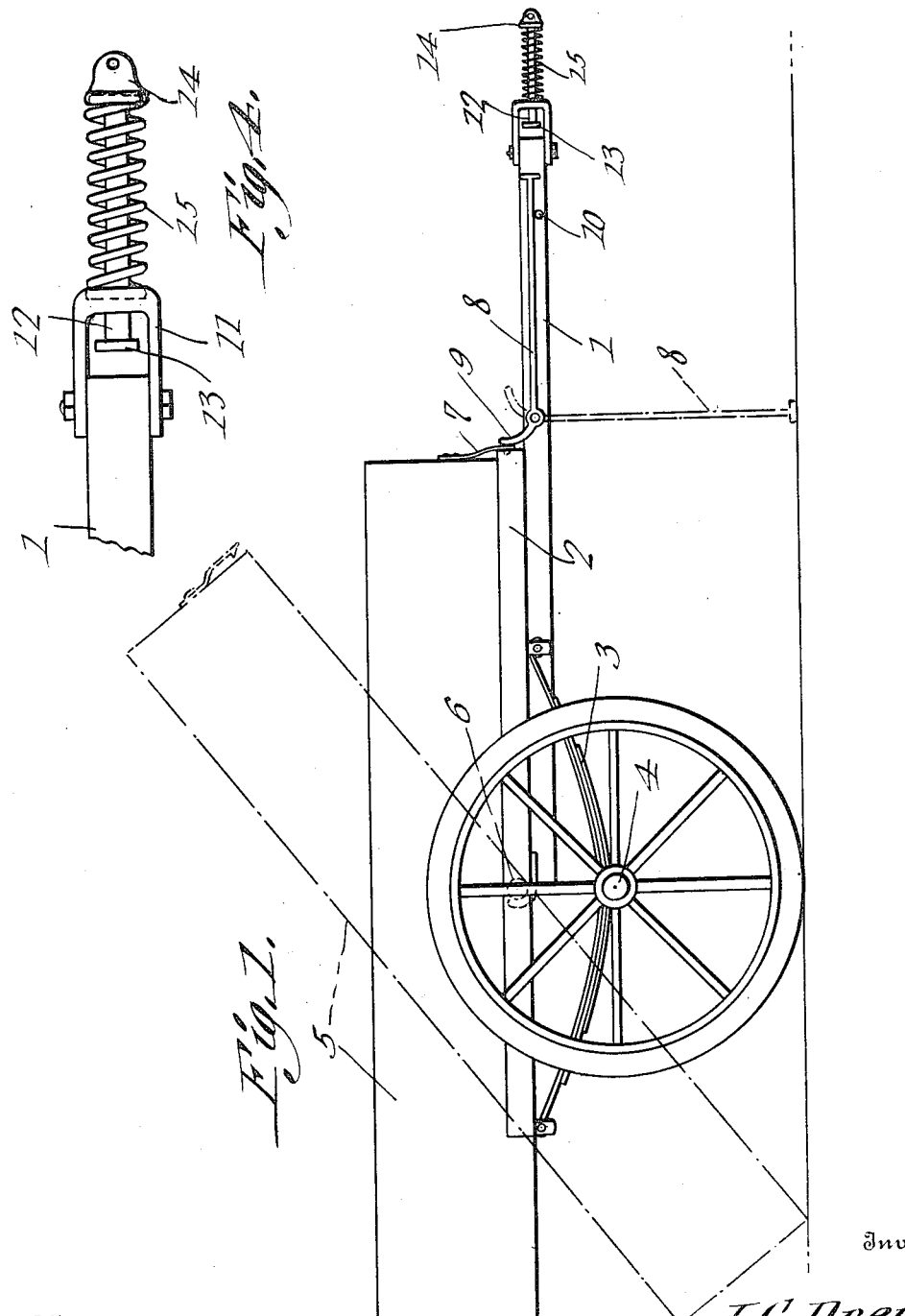

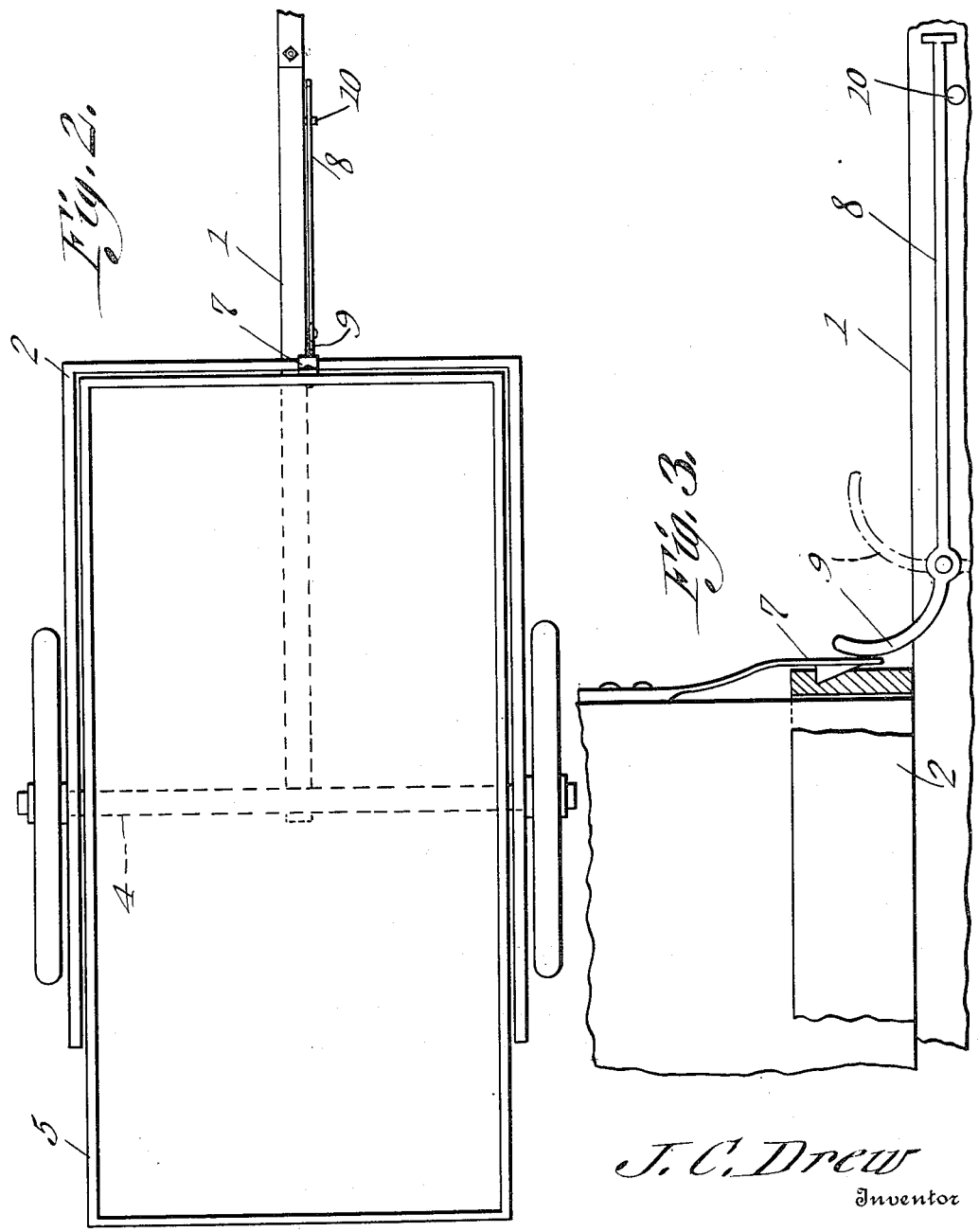

JAMES C. DREW, OF NEW ORLEANS, LOUISIANA.

TRAILER.

1,305,995.                    Specification of Letters Patent.    Patented June 10, 1919.

Application filed November 5, 1918. Serial No. 261,259.

*To all whom it may concern:*

Be it known that I, JAMES C. DREW, a citizen of the United States, residing at New Orleans, in the parish of Orleans and State of Louisiana, have invented a new and useful Trailer, of which the following is a specification.

This invention relates to trailers for vehicles, one of its objects being to provide a simple and efficient structure which is provided with a tiltable body, the supporting frame and the draft tongue of the body being resiliently mounted, thus to be protected from shocks and jolts that would soon produce injury to the trailer while in use.

Another object is to provide a lock for preventing the body from dumping, said lock having a guard which is simple and efficient and prevents accidental unlocking.

A still further object is to provide a resilient bumper for absorbing shocks due to the sudden starting of the trailer.

With the foregoing and other objects in view which will appear as the description proceeds, the invention consists of certain novel details of construction and combinations of parts which will be hereinafter more fully described and pointed out in the claim, it being understood that various changes may be made in the construction and arrangement of the parts without departing from the spirit or sacrificing any of the advantages of the invention as set forth in the appended claim.

In the accompanying drawings the preferred form of the invention has been shown.

In said drawings

Figure 1 is a side elevation of the trailer, the positions of the parts when the body is unlocked and dumped, being shown by dotted lines.

Fig. 2 is a plan view.

Fig. 3 is an enlarged side elevation of the lock and adjacent parts.

Fig. 4 is a detail view of the bumper.

Referring to the figures by characters of reference, 1 designates a draft tongue secured to a frame 2 which is in turn supported by springs 3 upon a wheel supported axle 4. The body of the trailer has been shown at 5 and is pivotally mounted at its center upon the sides of the frame 2, as shown at 6. A catch 7 is connected to the front end of the body and is adapted to engage the front portion of the frame 2 thus to hold the body against tilting, but when the catch is shifted in any desired manner, the body will be released and will dump as shown by dotted lines in Fig. 1.

To prevent accidental dumping of the body, a lever 8 is pivotally connected to one side of the tongue 1 and has a curved end 9 forming a cam adapted to push against the catch 7 and hold it in engagement with the frame 2. The other end of the lever is adapted to rest on a supporting pin 10 or the like. Thus it will be seen that before the body can be dumped it will be necessary first to disengage the lever 8 from its support 10 and then drop the lever so as to swing the cam 9 away from the catch. The catch can then be sprung out of engagement with the frame and the body will dump.

The front end of the tongue is provided with a combined coupling and bumper shown in detail in Fig. 4. This includes a yoke 11 straddling and fastened to the end of the tongue and having a rod 12 slidably mounted therein. A collar 13 is provided at the rear end of the rod and a coupling head 14 is located at the front end of the rod. A spring 15 is mounted on the rod and bears at one end against the head 14 and at its other end against the yoke 11, the spring being secured to both the head and the yoke. Thus when the trailer is pulled forward the spring will absorb the jerk and the same spring will also act as a buffer when the forward movement is stopped. The head 14 can be attached to a vehicle in any manner desired.

It will be noted that the body 5 and its supporting frame 2 as well as the tongue 1 are all mounted on the springs 3 which thus absorb shocks while the trailer is in motion and by reason of the provision of the shock absorbing means described the life of the trailer is materially prolonged.

What is claimed is:—

A trailer including a wheel supported frame having a forwardly extending tongue, a body tiltably mounted on the frame, a catch carried by the body for engaging the frame to hold the body against tilting, a supporting leg pivotally connected to the tongue and having a projecting cam end, and means for supporting the leg in elevated position along the tongue with its cam end pressing the catch into engagement with the frame, said leg, when depending from the tongue constituting a support for the front end of the frame.

In testimony that I claim the foregoing as my own, I have hereto affixed my signature in the presence of two witnesses.

JAMES C. DREW.

Witnesses:
 GEO. B. CAMPBELL,
 W. R. HAIGHT.